(12) United States Patent
Kailas et al.

(10) Patent No.: US 7,752,369 B2
(45) Date of Patent: Jul. 6, 2010

(54) BOUNDED STARVATION CHECKING OF AN ARBITER USING FORMAL VERIFICATION

(75) Inventors: Krishnan Kunjunny Kailas, Tarrytown, NY (US); Brian Chan Monwai, Austin, TX (US); Viresh Paruthi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 67 days.

(21) Appl. No.: 12/118,211

(22) Filed: May 9, 2008

(65) Prior Publication Data
US 2009/0282178 A1    Nov. 12, 2009

(51) Int. Cl.
*G06F 13/18* (2006.01)
(52) U.S. Cl. ............... 710/244; 710/113; 710/116; 710/240; 710/241
(58) Field of Classification Search .......... 710/100–317
See application file for complete search history.

(56) References Cited

U.S. PATENT DOCUMENTS

| | | | |
|---|---|---|---|
| 5,717,872 A | 2/1998 | Whittaker | |
| 5,761,446 A | 6/1998 | Donley et al. | |
| 5,935,234 A | 8/1999 | Arimilli et al. | |
| 6,718,422 B1 | 4/2004 | Kelley et al. | |
| 7,120,714 B2 | 10/2006 | O'Connor et al. | |
| 2006/0236010 A1* | 10/2006 | O'Connor et al. | 710/111 |

OTHER PUBLICATIONS

U.S. Appl. No. 12/101,734, filed Apr. 11, 2008, Kailas et al.
Dershowitz et al., "Bounded Fairness", Lecture Notes in Computer Science, vol. 2772, 2003, pp. 304-317.

* cited by examiner

*Primary Examiner*—Glenn A Auve
(74) *Attorney, Agent, or Firm*—Yee & Associates, P.C.; Diana R. Gerhardt

(57) ABSTRACT

A system for formal verification of bounded fairness properties of pseudo random number generators and arbiters that use random priority-based arbitration schemes. The formal verification system determines an upper bound of a request-to-grant delay of an arbiter in terms of a number of complete random sequences. The formal verification system also determines, in terms of a number of clock cycles, an upper bound and a lower bound of a length of a complete random sequence in the random number sequence generated by a random number generator used by the arbiter. The formal verification system then determines a worst case request-to-grant delay bounds of the arbiter system, in terms of a number of clock cycles, by combining the upper bound of the request-to-grant delay of the arbiter with the upper bound of the length of the complete random sequence and the lower bound of the length of the complete random sequence.

20 Claims, 8 Drawing Sheets

BOUNDED STARVATION CHECKING OF AN ARBITER USING FORMAL VERIFICATION

This invention was made with Government support under DARPA, HR0011-07-9-0002. The Government has certain rights in this invention.

CROSS REFERENCE TO RELATED APPLICATIONS

The present invention is related to the following co-pending U.S. patent application Ser. No. 12/101,734, filed on Apr. 11, 2008 to Kailas et al., entitled "METHOD AND STRUCTURE FOR PROVABLY FAIR RANDOM NUMBER GENERATOR" assigned to the present assignee, and incorporated herein by reference.

BACKGROUND OF THE INVENTION

1. Field of the Invention

The present invention relates generally to an improved formal verification system, and more specifically to formal verification of bounded fairness properties of pseudo random number generators and arbiters that use random priority based arbitration schemes.

2. Description of the Related Art

Electronic systems such as microprocessors and peripheral chips extensively use arbiters. The primary function of an arbiter is to restrict the number of concurrent accesses to a shared resource. A variety of arbitration schemes employed by arbiters serialize the access requests to the shared resource whenever there are more number of requests than the constant number of concurrent requests a shared resource can satisfy.

Processors use arbitration logic in several places, such as in the logic used for controlling the access to cache directories and shared buses. The commonly used arbitration schemes assign a priority to the input requests and grant the highest priority requests before other pending or concurrent low priority requests. The basis for the priority assignment may be either a fixed priority scheme (e.g., request i always gets higher priority than request j) or a dynamic priority scheme. Dynamic priority schemes include one based on the relative arrival time of the requests (e.g. first in, first out (FIFO)), one based on a strict rotation of priority assignments to the requests (e.g. round-robin), or one based on assigning a random priority to the incoming requests (e.g., pseudo random number generator). An example of a pseudo random number generator is a Linear Feedback Shift Register (LFSR). Regardless of the arbitration scheme used, it is important to specify and verify the desired fairness properties of the arbitration scheme. Fairness ensures that all requests are given equal opportunity to be granted and that no requests are forced to starve. Formal verification techniques may verify and prove that the arbitration logic is starvation free (i.e., the arbitration logic does not starve any requests indefinitely or beyond a certain number of cycles) under the specified fairness conditions.

BRIEF SUMMARY OF THE INVENTION

The illustrative embodiments provide a mechanism for formal verification of bounded fairness properties of pseudo random number generators and arbiters that use random priority based arbitration schemes. The formal verification system in the illustrative embodiments determines an upper bound of a request-to-grant delay of an arbiter in terms of a number of complete random sequences. A complete random sequence in a random number sequence is a shortest contiguous sequence of random numbers in the random number sequence having all possible unique random numbers at least once. The formal verification system also determines, in terms of a number of clock cycles, an upper bound and a lower bound of a length of a complete random sequence in the random number sequence generated by a random number generator used by the arbiter. The formal verification system then determines a worst case request-to-grant delay bounds of the arbiter system, in terms of a number of clock cycles, by combining the upper bound of the request-to-grant delay of the arbiter with the upper bound of the length of the complete random sequence and the lower bound of the length of the complete random sequence.

DETAILED DESCRIPTION OF THE INVENTION

Figure 1:
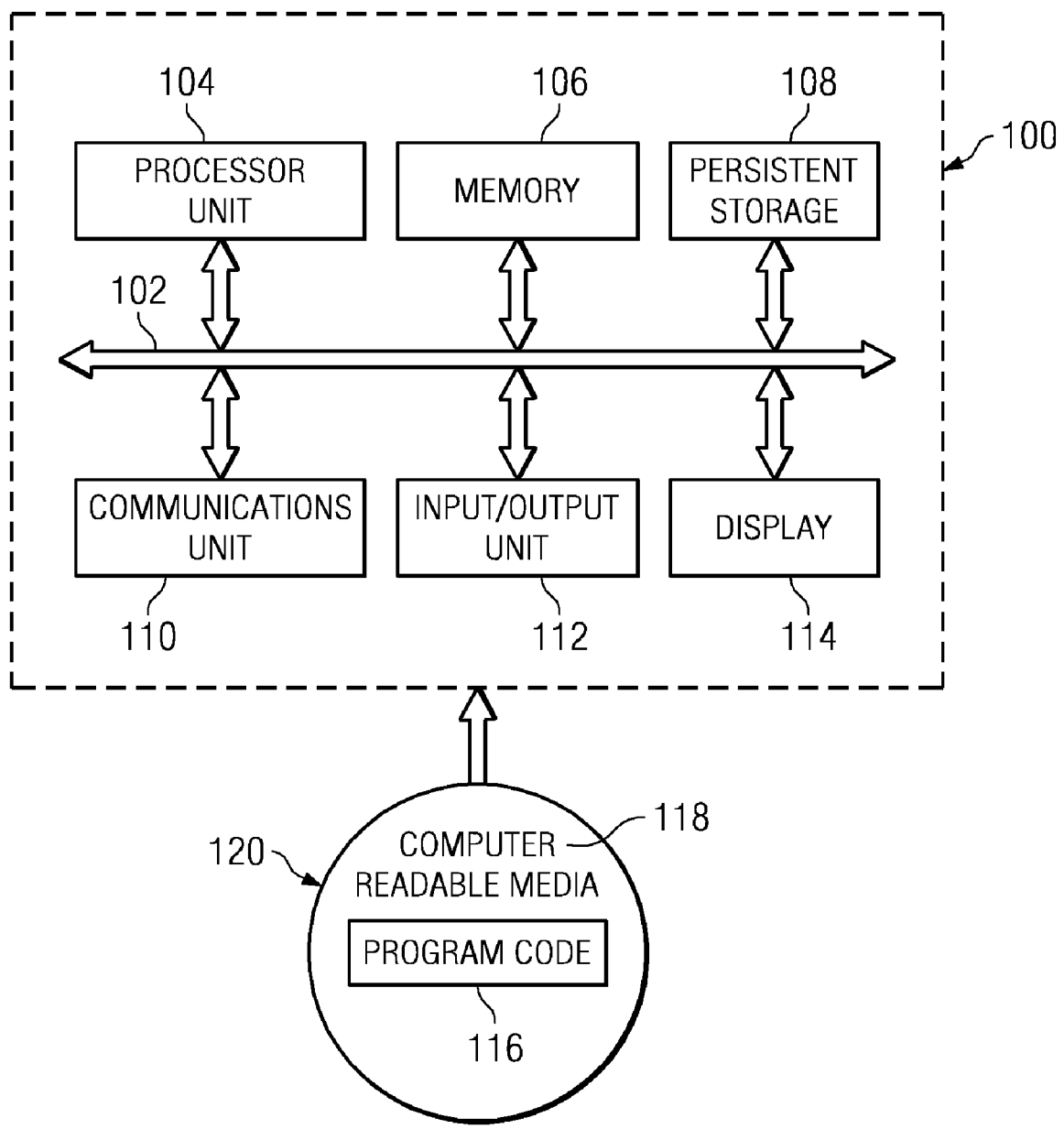
FIG. 1 is a block diagram of a data processing system in which the illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 depicts a diagram of a data processing system in accordance with an illustrative embodiment of the present invention. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices. A storage device is any piece of hardware that is capable of storing information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard and mouse. Further, input/output unit 112 may send output to a printer. Display 114 provides a mechanism to display information to a user.

Instructions for the operating system and applications or programs are located on persistent storage 108. These instructions may be loaded into memory 106 for execution by processor unit 104. The processes of the different embodiments may be performed by processor unit 104 using computer implemented instructions, which may be located in a memory, such as memory 106. These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 116 is located in a functional form on computer readable media 118 that is selectively removable and may be loaded onto or transferred to data processing system 100 for execution by processor unit 104. Program code 116 and computer readable media 118 form computer program product 120 in these examples. In one example, computer readable media 118 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 118 also may take the form of a persistent storage, such as a hard drive, a thumb drive, or a flash memory that is connected to data processing system 100. The tangible form of computer readable media 118 is also referred to as computer recordable storage media. In some instances, computer readable media 118 may not be removable.

Alternatively, program code 116 may be transferred to data processing system 100 from computer readable media 118 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown.

As one example, a storage device in data processing system 100 is any hardware apparatus that may store data. Memory 106, persistent storage 108 and computer readable media 118 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

Figure 2:
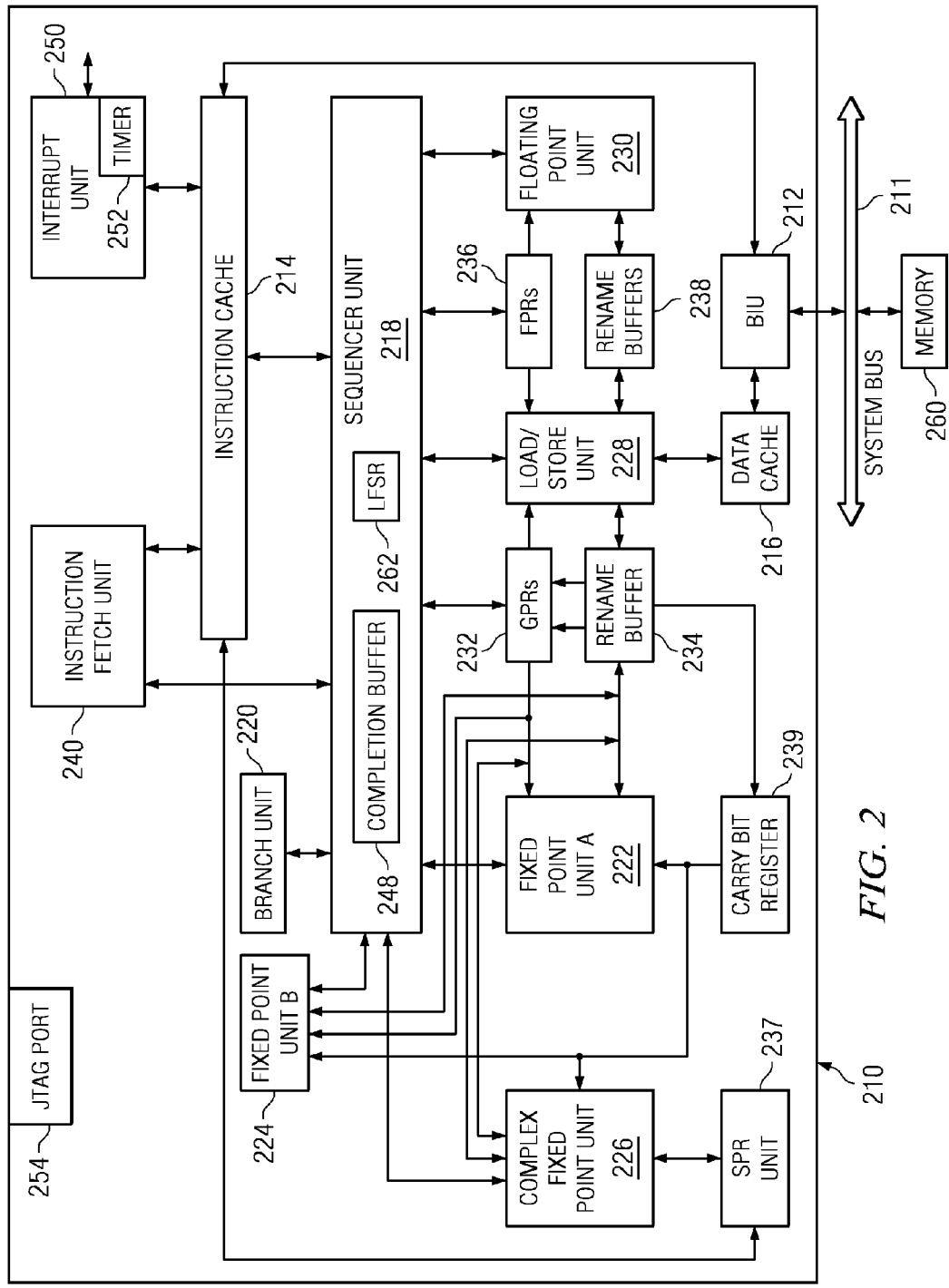
FIG. 2 is a block diagram of a multithreaded processor design showing functional units and registers in which the illustrative embodiments may be implemented.

FIG. 2 is a block diagram of a multithreaded processor design showing functional units and registers for implementing the illustrative embodiments. Processor 210 is an example of processor unit 104 in FIG. 1.

In an exemplary embodiment, processor 210 is a single integrated circuit superscalar microprocessor. Accordingly, as discussed further herein below, processor 210 includes various units, registers, buffers, memories, and other sections, all of which are formed by integrated circuitry. In addition, in an exemplary embodiment, processor 210 operates according to reduced instruction set computer ("RISC") techniques. As shown in FIG. 2, system bus 211 connects to bus interface unit ("BIU") 212 of processor 210. BIU 212 controls the transfer of information between processor 210 and system bus 211.

BIU 212 connects to an instruction cache 214 and to data cache 216 of processor 210. The instruction and data caches 214 and 216 may in general be implemented as a cache hierarchy of multiple levels: L1, L2, L3, . . . etc. Instruction cache 214 outputs instructions to sequencer unit 218. In response to such instructions from instruction cache 214, sequencer unit 218 selectively outputs instructions to other execution circuitry of processor 210. A translation lookaside buffer (TLB) is a table in the processor's memory that contains information about the pages in memory the processor accessed recently. The TLB may be used to translate virtual addresses—derived from the address generation mechanisms implicit in the user-level program code, as generated by sequencer unit 218 and load/store unit 228—into real or physical addresses that map into the actual memory address space allocated for the given application program.

In addition to sequencer unit 218, in an exemplary embodiment, the execution circuitry of processor 210 includes multiple execution units, namely a branch unit 220, a fixed-point unit A ("FXUA") 222, a fixed-point unit B ("FXUB") 224, a complex fixed-point unit ("CFXU") 226, a load/store unit ("LSU") 228, and a floating-point unit ("FPU") 230. FXUA 222, FXUB 224, CFXU 226, and LSU 228 input their source operand information from general-purpose architectural registers ("GPRs") 232 and fixed-point rename buffers 234. Moreover, FXUA 222 and FXUB 224 input a "carry bit" from a carry bit ("CA") register 239. FXUA 222, FXUB 224, CFXU 226, and LSU 228 output results (destination operand information) of their operations for storage at selected entries in fixed-point rename buffers 234. In addition, CFXU 226 inputs and outputs source operand information and destination operand information to and from special-purpose register processing unit ("SPR unit") 237.

FPU 230 inputs its source operand information from floating-point architectural registers ("FPRs") 236 and floating-point rename buffers 238. FPU 230 outputs results (destination operand information) of its operation for storage at selected entries in floating-point rename buffers 238. In response to a load instruction, LSU 228 inputs information from data cache 216 and copies such information to selected ones of rename buffers 234 and 238. If such information is not stored in data cache 216, then data cache 216 inputs (through BIU 212 and system bus 211) such information from a system memory 260 connected to system bus 211. Moreover, data cache 216 is able to output (through BIU 212 and system bus 211) information from data cache 216 to system memory 260 connected to system bus 211. In response to a store instruction, LSU 228 inputs information from a selected one of GPRs 232 and FPRs 236 and copies such information to data cache 216.

Sequencer unit 218 inputs and outputs information to and from GPRs 232 and FPRs 236. From sequencer unit 218, branch unit 220 inputs instructions and signals indicating a present state of processor 210. In response to such instructions and signals, branch unit 220 outputs (to sequencer unit 218) signals indicating suitable memory addresses storing a sequence of instructions for execution by processor 210. In response to such signals from branch unit 220, sequencer unit 218 causes instruction fetch unit 240 to fetch the indicated sequence of instructions from instruction cache 214. If one or more of the sequence of instructions is not stored in instruction cache 214, then instruction cache 214 inputs (through BIU 212 and system bus 211) such instructions from system memory 260 connected to system bus 211. Embedded within (but not shown) sequencer unit 218 is an instruction decode unit and an instruction dispatch unit. The instruction decode unit decodes instructions and passes decoded instructions to the instruction dispatch unit. The instruction dispatch unit selectively groups decoded instructions from instruction decode unit for each thread, and outputs a group of instructions for each thread.

In response to the instructions input from instruction cache 214, sequencer unit 218 selectively dispatches the instructions to selected ones of execution units 220, 222, 224, 226, 228, and 230. Sequencer unit 218 employs linear feedback shift register (LFSR) 262 to assign priorities to each of the executing threads. LFSR 262 is used to pseudo-randomly select instructions for dispatch by generating pseudo-random patterns of particular values. Upon assigning random priority numbers to the threads, sequencer unit 218 selectively dispatches the instructions in order of the assigned priority numbers to selected execution units.

Each execution unit executes one or more instructions of a particular class of instructions. For example, FXUA 222 and FXUB 224 execute a first class of fixed-point mathematical operations on source operands, such as addition, subtraction, ANDing, ORing and XORing. CFXU 226 executes a second class of fixed-point operations on source operands, such as fixed-point multiplication and division. FPU 230 executes floating-point operations on source operands, such as floating-point multiplication and division.

Information stored at a selected one of fixed-point rename buffers 234 is associated with a storage location (e.g. one of GPRs 232 or carry bit (CA) register 239) as specified by the instruction for which the selected rename buffer is allocated. Information stored at a selected one of fixed-point rename buffers 234 is copied to its associated one of GPRs 232 (or CA register 239) in response to signals from sequencer unit 218. Sequencer unit 218 directs such copying of information stored at a selected one of fixed-point rename buffers 234 in response to "completing" the instruction that generated the information. Such copying is called "writeback."

Upon storing information at a selected one of floating-point rename buffers 238, such information is associated with one of FPRs 236. Information stored at a selected one of floating-point rename buffers 238 is copied to its associated one of FPRs 236 in response to signals from sequencer unit 218. Sequencer unit 218 directs such copying of information stored at a selected one of floating-point rename buffers 238 in response to "completing" the instruction that generated the information.

Within sequencer unit 218, completion buffer 248 tracks the completion of the multiple instructions, which are being executed within the execution units. Upon an indication that an instruction or a group of instructions have been completed successfully, in an application specified sequential order, completion buffer 248 may be utilized to initiate the transfer of the results of those completed instructions to the associated general-purpose registers. Completion buffer 248 comprises a global completion table (GCT) which keeps track of valid (live) instructions within the microprocessor from decode/dispatch through completion.

Additionally, processor 210 includes interrupt unit 250. Interrupt unit 250 connects to instruction cache 214. Additionally, although not shown in FIG. 2, interrupt unit 250 connects to other functional units within processor 210, including sequencer unit 218. Interrupt unit 250 may receive signals from other functional units and initiate an action, such as starting an error handling or trap process. In these examples, interrupt unit 250 generates interrupts and exceptions that may occur during execution of a program. Interrupt unit 250 includes timer 252.

Additionally, processor 210 includes JTAG port 254, which connects to an external service element, which is not shown. Latches comprise every element of processor 210. JTAG port 254 connects to all the latches that comprise the elements of processor 210. The architecture depicted in FIG. 2 is provided solely for the purpose of illustrating and explaining the embodiments of the present invention, and is not meant to imply any architectural limitations. Those skilled in the art will recognize that many variations are possible.

Linear Feedback Shift Register (LFSR)-based random priority arbiters are commonly used for granting a subset of several concurrent read and write requests to access a cache directory (for example) in every cycle. These random priority-based arbiters grant one of the pending requests to access the cache directory based on the random number generated by the LFSR logic in the current cycle. Starvation of a request may occur if the specific random number corresponding to the request is not generated by the LFSR for a long time. Delaying a directory access request beyond a certain number of cycles can have serious performance impact.

As previously mentioned, one may verify and prove, using formal verification techniques, that the arbitration logic is starvation free (i.e., the logic does not starve any requests indefinitely or beyond a certain number of cycles) under the specified fairness conditions. Typical formal verification approaches used for verifying arbiters leverage temporal logics to specify "liveness" properties which are then evaluated by the underlying decision procedure to check for the absence of deadlocks. The liveness property claims that a grant for a request will be issued eventually. However, the fairness properties of an arbitration scheme that uses random numbers (generated, for example, with an LFSR) to assign priorities to the input requests can be difficult to specify. For instance, a proof of liveness does not provide any guarantees on the request-to-delay bounds, except that the proof of liveness guarantees that a grant will be issued eventually (which can be delayed for unacceptable number of cycles making such a proof less valuable from the functional correctness and performance view point). Thus, the focus of existing formal verification techniques is on proving that deadlocks cannot happen in an infinite execution of the machine. In real applications, proof that the pseudo random number generator produces a sequence of random numbers is not sufficient, because that only proves that any given random number will be generated eventually (i.e., any given request will be granted eventually). Consequently, determining the bounds of the request to grant delay can be difficult, in addition to verifying that the arbitration logic is starvation free.

The illustrative embodiments provide a solution to the problem of verification of arbiters that use a random-priority based arbitration scheme. The illustrative embodiments provide a new formal verification methodology to verify the bounded request-to-grant delay (fairness) properties of random priority based arbiters. Bounded fairness is a stronger notion than the eventuality-based fairness. Bounded fairness guarantees a fixed time bound for an event to occur. The concept of bounded fairness is described in further detail in the article entitled "Bounded Fairness" by N. Dershowitz, D. N. Jayasimha and S. Park, published in Lecture Notes in Computer Science, Vol. 2772, Pages 304-317, ISBN 978-3-540-21002-3, 2004. The formal verification technique described in the illustrative embodiments is based on a method to specify fairness conditions of the LFSR input sequence that can be verified using formal verification tools. The illustrative embodiments quantify the worst-case request-to-grant delay under the specified fairness conditions using an iterative approach in which the fairness constraints provided by the linear feedback shift register (LFSR) input sequence and the request-to-grant delay bounds are determined using bounded fairness property checking.

To quantify and verify the bounded fairness properties of the random priority based arbiter design under verification, the illustrative embodiments implement a fairness checker logic using a three step process. In the first step, the formal verification method using fairness checker logic proves a property of the arbiter independent of the characteristics of the particular pseudo random number generator driving the arbiter. This first step quantifies the upper bound of the request-to-grant delay of the arbitration logic in terms of the number of "complete random sequences" (as opposed to the number of clock cycles) to determine the bounded liveness property of the system. A complete random sequence (CRS) in a random number sequence is defined as a shortest contiguous sequence of random numbers in the random number sequence that has all the possible unique random numbers at least once. In the second step, the formal verification method using fairness checker logic proves a property of the particular pseudo random number generator driving the arbiter, independent of the characteristics of the arbitration logic. This second step quantifies the length (lower bound and upper bound characteristics) in number of clock cycles of a complete random sequence in the sequence of random numbers generated by the specific pseudo random number generator driving the arbiter to determine the bounded fairness property of the system. In the third step, the results of the first step and second step are combined to determine the worst case request-to-grant delay bounds in terms of the number of clock cycles of the entire arbitration logic, including the arbitration logic and the pseudo random number generator logic driving the arbiter. This third step substitutes the lower and upper bound length values of the complete random sequences determined in the second step to verify that the request-to-grant delay bounds computed in the first step are within the design specifications.

The formal verification scheme described in the illustrative embodiments comprises various advantages over existing verification techniques. The formal verification scheme in the illustrative embodiments quantifies the fairness properties of pseudo random number generators and arbiters that use random priority based arbitration schemes. The formal verification scheme uses relatively small amount of additional logic in the testbench, such that formal verification of bounded fairness properties is not adversely impacted due to the presence of this logic from a capacity standpoint. In addition, unlike the existing verification techniques, the formal verification scheme in the illustrative embodiments allows for proving that the arbiter is deadlock-free, as well as proving that the arbiter adheres to the design specifications, such as request-to-grant delay bounds.

Figure 3:
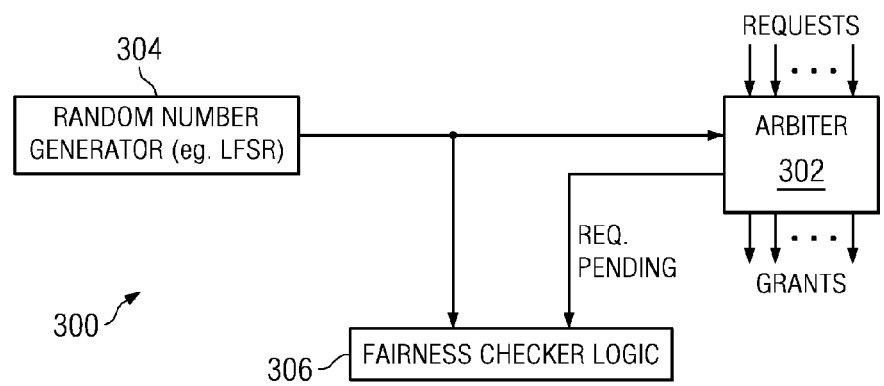
FIG. 3 is a high-level block diagram of a data processing system comprising an arbiter driven by a pseudo random number generator in accordance with the illustrative embodiments.

FIG. 3 is a high-level block diagram of an arbitration logic and a testbench for formal verification of bounded fairness properties of the arbitration logic in accordance with the illustrative embodiments. Formal verification system 300 comprises the Design Under Verification (DUV), which comprises arbiter 302, driven by random number generator 304, and fairness checker logic 306. Formal verification system 300 including the DUV or components of the DUV may be implemented in processor 210 in FIG. 2.

Arbiter 302 is an electronic device that controls access to shared resources, such as cache directories and shared buses. Arbiter 302 restricts the number of concurrent accesses to a shared resource by serializing the access requests to the shared resource when there are more requests than the constant number of concurrent requests a shared resource can satisfy. Arbiter 302 comprises an arbitration scheme based on assigning a random priority to the incoming requests. A random arbitration scheme provides an opportunity for any of the requests to be assigned the highest priority at random.

Pseudo random number generator 304 provides an input comprising a sequence of randomly generated numbers to arbiter 302. In this illustrative example, pseudo random number generator 304 is a linear feedback shift register (LFSR). When arbiter 302 receives the input from pseudo random number generator 304, arbiter 302 assigns a randomly generated number from the input to each incoming request. The randomly generated number assigned to a request indicates the priority level of that request. Alternatively, in certain types of random priority arbiters, in each cycle, one of the pending or incoming requests corresponding to the current value of the random number is granted. Arbiter 302 grants requests assigned with the highest priority before granting other pending or concurrent low priority requests. Thus, using pseudo random number generator 304 to drive arbiter 302 enables arbiter 302 to provide unbiased service to all requests.

Formal verification scheme using fairness checker logic 306 determines the request-to-delay bounds of the random priority based arbiter and proves that the design under verification (arbiter) functions correctly and it functions within the design specifications. To determine the fairness of the arbitration scheme implemented, fairness checker logic 306 monitors the random number sequence generated by pseudo random number generator 304 and the status of the requests within arbiter 302. In order to monitor the random number sequence, fairness checker logic 306 receives the input of randomly generated numbers from pseudo random number generator 304. Fairness checker logic 306 examines the random number sequences from pseudo random number generator 304 to identify complete random sequences. A complete random sequence generated by pseudo random number generator 304 is a shortest contiguous sequence of random numbers that contains all of the possible unique random numbers in the random number sequence at least once. For example, for a pseudo random number generator able to generate an N bit random number, there are $2^N$ unique numbers in the output of such a pseudo random number generator.

When a complete random sequence in a random number sequence is identified, fairness checker logic 306 also examines the complete random sequence to determine if the complete random sequence is the shortest complete random sequence or the longest complete random sequence that can be generated by the random number generator. Note that the fairness checker logic 306 using finite amount of logic can only identify finite length complete random sequences. The shortest complete random sequence for a random number sequence is a sequence that contains exactly one copy of each unique number in the random number sequence. For example, if pseudo random number generator 304 is able to generate one N bit random number in every clock cycle, the length of the shortest complete random sequence will be $2^N$ clock cycles. Thus, the shortest complete random sequence generated by a pseudo random number generator for a random number sequence comprises $2^N$ numbers that contain exactly one copy of each unique number. The longest complete random sequence generated by a pseudo random number generator may be infinitely long. In other words, pseudo random number generator 304 may take a variable number of cycles from $2^N+1$ to infinity to generate a complete random sequence.

Figure 4:
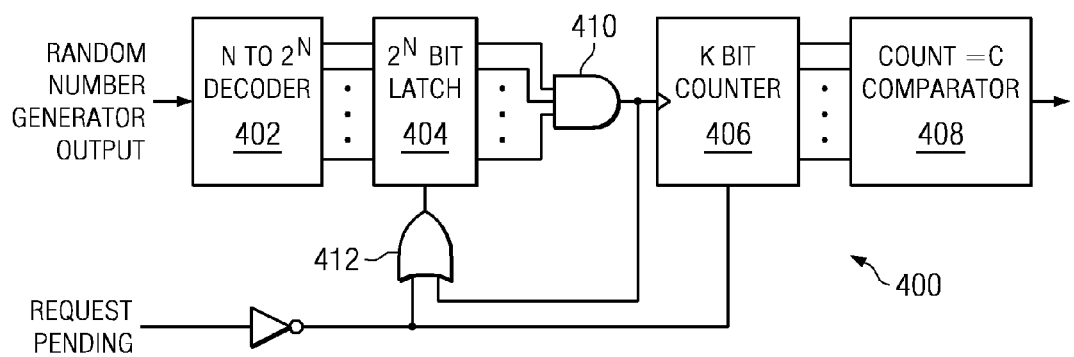
FIG. 4 is a block diagram of the fairness checker logic for quantifying the upper bounds of the request-to-grant delay in terms of the number of complete random sequences in accordance with the illustrative embodiments.

FIG. 4 is a block diagram of the fairness checker logic used by a formal verification tool for determining the upper bound of the request-to-grant delay in accordance with the illustrative embodiments. Fairness checker logic 400 is an example of fairness checker logic 306 in FIG. 3. In particular, fairness checker logic 400 comprises various components used to perform the first verification step of determining the upper bound of the request-to-grant delay of the arbiter in terms of the number of complete random sequences. This verification step proves a bounded liveness property (i.e., a request will be granted in a bounded time) of the arbiter. For each input from the pseudo random number generator, fairness checker logic 400 uses a latch to keep track of the occurrences of unique numbers in the random number sequence, and uses a counter to keep track of the number of complete random sequences in the random number sequence for a time when a request is issued until the request is granted.

In this illustrative example, until a request arrives at arbiter 302 in FIG. 3, fairness checker logic 400 resets the $2^N$ bit latch 404 and k-bit counter 406. As long as the arbiter does not grant the request, fairness checker logic 400 keeps track of the unique numbers in the random number sequence generated by pseudo random number generator 306 in FIG. 3.

After the $2^N$ bit latch 404 and k-bit counter 406 have been reset, N to $2^N$ decoder 402 receives input from pseudo random number generator 304 in FIG. 3. This input comprises a sequence of randomly generated N bit numbers output from pseudo random number generator 304. Upon receiving the input, N to $2^N$ decoder 402 decodes the random number sequence input into $2^N$ 1-bit signals, each bit corresponding to one of the $2^N$ unique random numbers. N to $2^N$ decoder 402 then feeds the $2^N$ 1-bit signals to $2^N$ bit latch 404. Upon receiving the 1-hot $2^N$ 1-bit signals from N to $2^N$ decoder 402, $2^N$ bit latch 404 sets the bit corresponding to the non-zero 1-bit signal. For instance, if the N bit random number is j, fairness checker logic 400 sets the jth bit of $2^N$ bit latch 404. When all of the bits in $2^N$ bit latch 404 have been set, $2^N$ input AND gate 410 generates a signal indicating that a complete random sequence is found, since the setting of all bits in the latch indicates that the pseudo random number generator has generated at least one copy of all of the unique numbers in the random number sequence. This signal is also used to reset all the bits in $2^N$ bit latch 404 if the request is still pending via OR gate 412.

Upon receiving the signal indicating the presence of a complete random sequence in $2^N$ bit latches 404, fairness checker logic 400 increments k-bit counter 406. Thus, k-bit counter 406 is a binary counter that keeps track of the number of complete random sequences in the random number sequence for a time when a request is issued until the request is granted (i.e., while the request is pending). k-bit counter 406 counts the number of detected sequences from 0 to k. The size of k in k-bit counter 406 may be selected based on the desired worst-case request-to-grant delay as required by the design specifications of the arbiter. In this illustrative example, fairness checker logic 400 may keep track of up to $2^k-1$ complete random sequences.

k-bit counter output values are compared with a constant value C using a comparator 408. Constant value C represents the request-to-grant delay in terms of the number of complete random sequences that the formal verification method shall be trying to prove in each one of the many iterative proof steps. As k-bit counter 406 may count from 0 to $2^k$, the count value will be within this range. Consequently, the initial value of constant C may be set by fairness checker logic 400 as any value from 0 to $2^k$. Regardless of the initial value of C selected, the formal verification method systematically searches the possible range of values of C in an iterative manner to find the largest value of C for which the following property holds for all possible sequences that can be generated by a random number generator:

(request pending==TRUE) AND (number of complete random sequences==C) where $C<2^k-1$.

Comparator 408 will repeatedly obtain the next counter value (which will be the same as the previous value unless a new complete random sequence is detected) from the k-bit counter, and this counter value is compared with the constant C in every cycle. The value of C is changed in each proof step. For example, if the initial value of C selected is C=1, the value of C is incremented in each proof step until a proof step is reached in which the property above no longer holds, which indicates that we have gone beyond the largest value of C that we are interested in. If the initial value of C selected is $C=2^k$, the value of C is decremented in each proof step until a proof step is reached in which the above property holds, which indicates that we have reaches the largest value of C that we are interested in. The "request is pending" aspect is captured by the term "(request pending==TRUE)" in the above Boolean equation used for bounded liveness property checking, while the outcome of the comparison with constant C using the comparator is captured by the term "(number of complete random sequences==C)".

It should be noted that the process of determining the largest value of C need not include the pseudo random number generator logic. Rather, a random number generator function may drive the arbitration logic to reduce the complexity of the design under verification.

Figure 5:
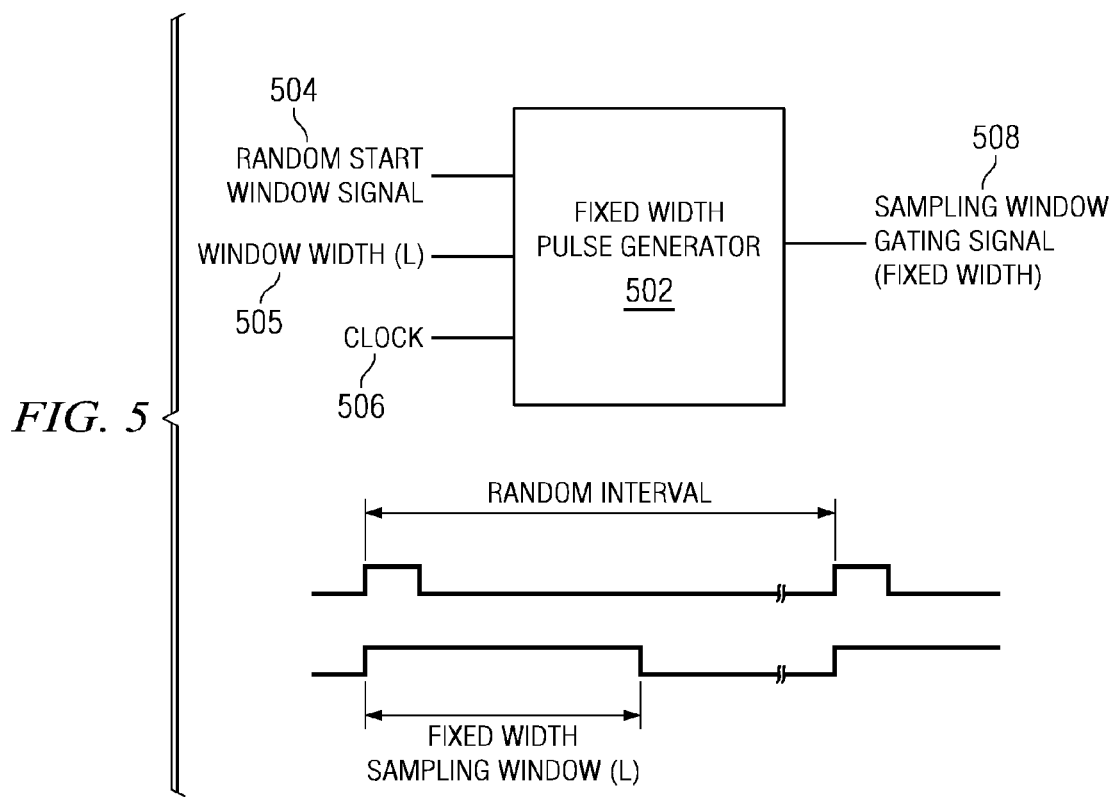
FIG. 5 is a diagram illustrating a sampling window gating signal with random periodicity in accordance with the illustrative embodiments.

FIG. 5 is a diagram illustrating a sampling window gating signal with random periodicity in accordance with the illustrative embodiments. The second verification step uses a sampling window gating signal in the process of accurately quantifying the upper and lower bounds of the length (in number of cycles) of complete random sequences generated by a specific implementation of random number generator such as a LFSR as described in FIG. 6. The second verification step uses the sampling window gating signal to sample the input random number sequence from the pseudo random number generator for a fixed time interval at random instances.

To create the sampling window gating signal, fixed width pulse generator 502 receives an input comprising random start window signal 504, an input specifying the window width 505 and an input comprising clock signal 506. Random start window signal 504 is a signal that triggers a random starting point for the sampling window. The fixed width sampling window gating signal 508 may be generated by the fixed width pulse generator 502 using a counter that can count up to a fixed number of clock cycles (e.g., n cycles >L, where L is the fixed width of the pulse in cycles). Fixed width pulse generator 502 may generate various sampling window gating signals 508 of fixed width L by varying random start window signal 504 to start the sampling window at various points in time. The width of the sampling window gating signal is specified by the window width input signal L 505. In this manner, the fairness checker logic may sample the random number sequence from the pseudo random number generator using sampling windows of different sizes (differing numbers of clock cycles), and sampling windows starting at random instances in the clock cycles.

Figure 6:
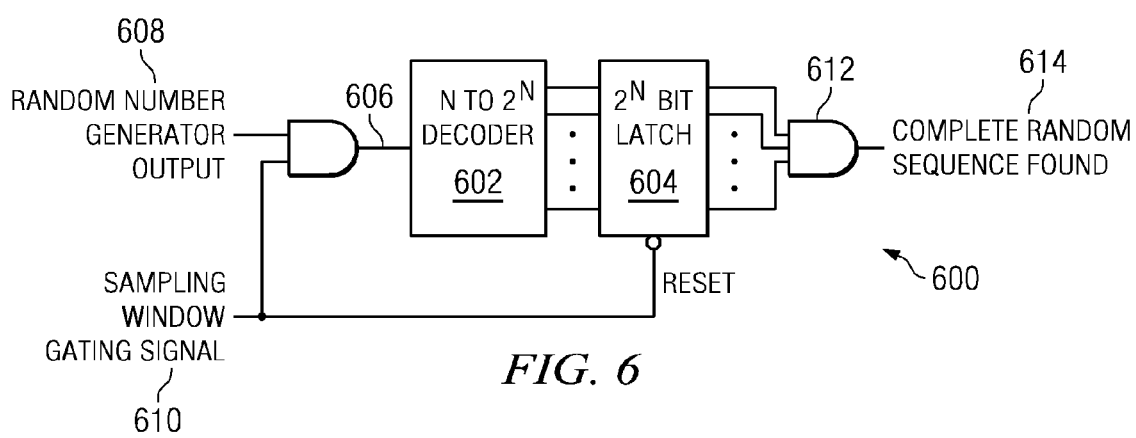
FIG. 6 is a block diagram of the fairness checker logic for quantifying an upper and lower bounds of the length of complete random sequences in the sequence of random numbers generated by a random number generator in accordance with the illustrative embodiments.

FIG. 6 is a block diagram of the fairness checker logic for determining the length (in cycles) of the longest and shortest complete random sequences in a sequence of random numbers in accordance with the illustrative embodiments. Fairness checker logic 600 is similar to the fairness checker logic 306 in FIG. 3. In particular, fairness checker logic 600 comprises various components used to perform the second verification step comprising an iterative proof approach for quantifying the length of longest and shortest complete random sequences in the random number sequence generated by a random number generator such as an LFSR. For each input from the pseudo random number generator, fairness checker logic 600 uses latches to keep track of the occurrences of unique numbers in the random number sequence.

Fairness checker logic 600 uses N to $2^N$ decoder 602 and $2^N$ bit latch 604 to monitor the unique random numbers in the gated pseudo random number generator output 606 for each sampling window size. The inverse of the fixed width sampling window gating signal causes a reset of all of the bits in $2^N$ bit latch 604. N to $2^N$ decoder 602 receives gated random number sequence output 606. This pseudo random number generator output comprises a random number sequence 608 from a random number generator 304 in FIG. 3 gated with sampling window gating signal 610 generated by fixed width pulse generator 502 as described in FIG. 5. The gated output 606 comprises a sequence of randomly generated numbers output from the pseudo random number generator within a particular sampling window of a fixed width (i.e., within a fixed number of clock cycles) at a random starting point in time.

Upon receiving gated output 606, N to $2^N$ decoder 602 decodes the random number sequence into $2^N$ 1-bit signals, each bit corresponding to one of the $2^N$ unique random numbers and feeds these $2^N$ 1-bit signals to $2^N$ bit latch 604. $2^N$ bit latch 604 sets the latch bit corresponding to the non-zero 1-bit signal. When all of the bits in $2^N$ bit latch 604 have been set, $2^N$ input AND gate 612 generates a signal 614 indicating that a complete random sequence in the particular fixed width sampling window has been found, since the setting of all bits in the latch indicates that gated pseudo random number generator output comprises at least one copy of all of the unique numbers in the random number sequence in the particular fixed width sampling window.

Fairness checker logic 600 allows for using formal verification techniques to accurately determine the upper and lower bounds of the length of complete random sequences in the random number sequence by varying the fixed sampling window size and proving that the fixed sampling window contains exactly one complete random sequence. For a given fixed length L of the gated sampling window, output signal "complete random sequence found" 614 of fairness checker logic 600 may be used to prove that the random number generator may generate a complete random sequence of length L. The property "complete random sequence found==FALSE" holds only when $L<L_{min}$ and $L>L_{max}$, where $L_{min}$=length of shortest complete random sequence and $L_{max}$=length of longest complete random sequence. In other words, the length of the longest complete random sequence can be determined by observing the values of $L>L_{min}$ for which the property holds. The length of the shortest complete random sequence can be determined as the smallest value of L for which the following property complete random sequence found==TRUE holds for all possible window start cycles. Similarly, the length of the sampling window can be varied in each proof step such that we can determine the smallest value of the length of complete random sequence $L>L_{min}$ for which the property complete random sequence found==FALSE holds for all possible random window start cycles. The value of L determined is $1+L_{max}$.

Once the upper and lower bounds of the length of the complete random sequences generated by the random number generator is determined in number of cycles using the second verification step in FIG. 6, the third verification step uses the upper and lower bounds of the length of the complete random sequences generated by the pseudo random number generator to determine the worst-case request-to-grant delay bounds of the arbiter in terms of clock cycles. In this third step, the upper and lower bounds of the length of the complete random sequence computed in the second verification step may each be combined with the result (largest value of C) computed in the first step to obtain the worst-case request-to-grant delay bounds in cycles of the arbiter. The length (upper bound and lower bound) of the complete random sequence (in cycles) obtained from the second step is combined with the result obtained in the first step in the following manner:

largest value of C×"length of complete random sequence in cycles"

to determine the worst-case request-to-grant delay bounds of the arbitration logic in number of cycles. Thus, with the formal verification scheme provided in the illustrative embodiments, the fairness properties of the arbitration logic may be verified with the design specifications.

Figure 7:
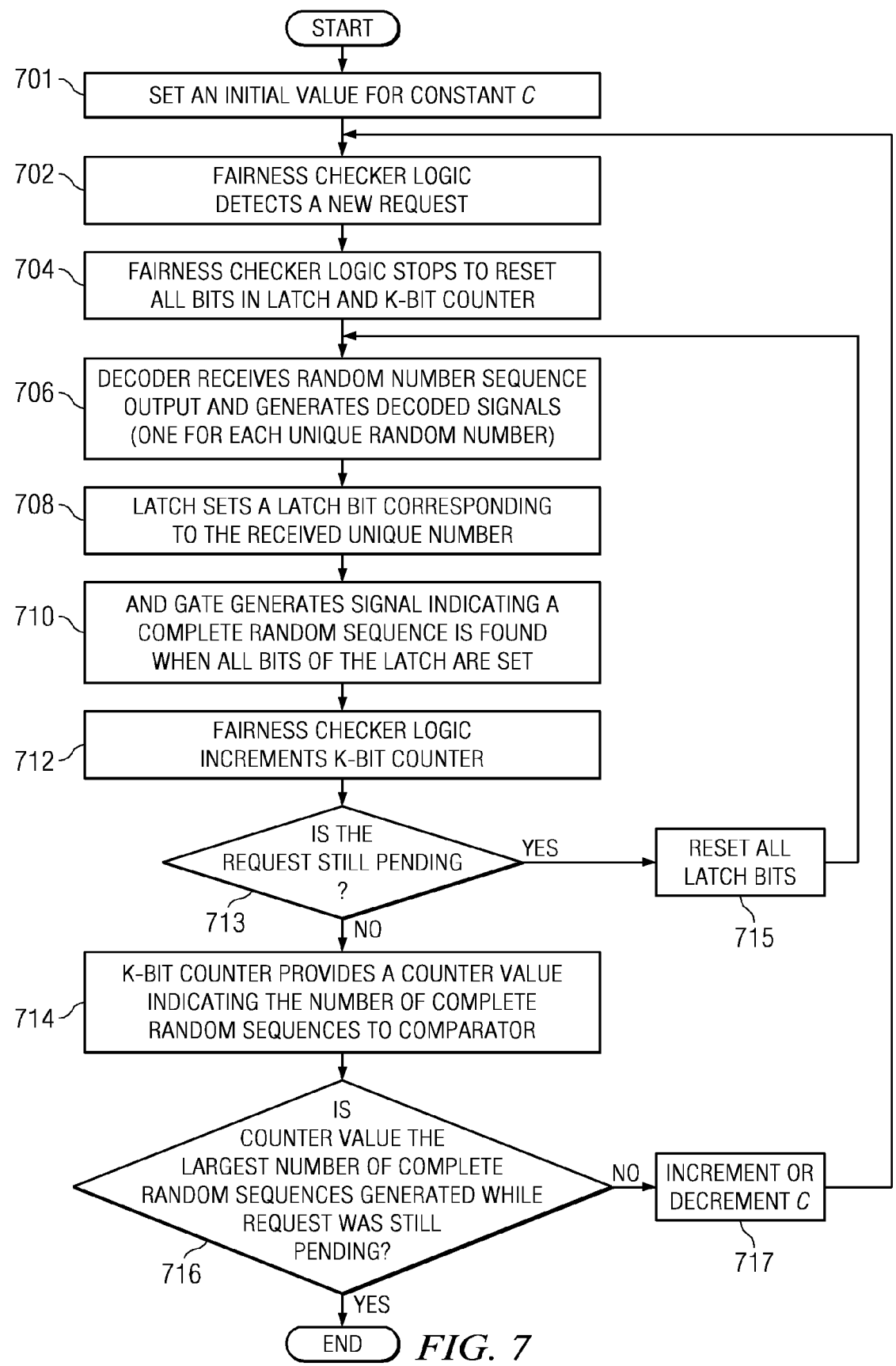
FIG. 7 is a flowchart of a process for quantifying the upper bounds of the request-to-grant delay in terms of the number of complete random sequences in accordance with the illustrative embodiments.

FIG. 7 is a flowchart of a process for verifying the bounded liveness properties of an arbiter that uses a random priority based arbitration scheme in accordance with the illustrative embodiments. The process in FIG. 7 describes the first step in the formal verification scheme for quantifying the upper bound of the request-to-grant delay of an arbiter in terms of the number of "complete random sequences". The process described in FIG. 7 may be used for verifying the random arbitration logic (design under verification) along with the fairness checking logic used by the testbench 300 in FIG. 3.

The process begins with setting an initial value for constant value C (step 701). When the fairness checker logic in an arbitration scheme comprising an arbiter using a pseudo random number generator detects that the arbiter received a new request (step 702), fairness checker logic implements the first verification step of determining the bounded liveness property of the system by quantifying the upper bound of the request-to-grant delay of the arbiter. The fairness checker logic expresses the upper bound of request to grant delay in terms of the number of complete random sequences in the random number sequence generated by the pseudo random number generator used by the arbiter. Fairness checker logic stops to reset all of the bits in a latch and a k-bit counter in the logic corresponding to the particular request (step 704). A decoder in the logic receives the random number sequence output from a random number generator function (not the actual LFSR logic) and generates decoded signals (one for each unique random number) (step 706). Upon receiving a unique random number from the decoder, the latch sets a latch bit corresponding to the received unique number (step 708). When all of the bits in latch have been set, the AND gate that logically ANDs the latch outputs generates a signal indicating that a complete random sequence is found (step 710). This signal also resets all the bits in the latch if the request is still pending (i.e., the request has not been granted by the arbiter).

Upon receiving the signal indicating the presence of a complete random sequence in the latch, the logic increments a counter (step 712). The counter keeps track of the number of complete random sequences in the random number sequence while the request is pending. A determination is then made as to whether the request is still pending (step 713). If the request is still pending ('yes' output of step 713), all of the bits in the latch are reset (step 715), with the process returning to step 706.

However, if the request is no longer pending ('no' output of step 713), the counter iteratively feeds a counter value indicating the current number of complete random sequences found to a comparator (step 714). The comparator compares the counter value to the constant C in order to make a determination whether the current counter value is the largest number of complete random sequences generated in the random number sequence when the request was still pending (step 716). The largest number of complete random sequences C indicates the upper bound of delay (the longest delay period) that a request may experience before the request is granted by the arbiter. If the largest number of complete random sequences generated while the request was still pending has been found ('yes' output of step 716), the first step in the verification process terminates thereafter. However, if the largest number of complete random sequences generated while the request was still pending has not been found ('no' output of step 716), the fairness checker logic changes the constant C by incrementing the value of C if the initial value of C is a small value (e.g., C=1), or decrementing the value of C if the initial value of C is a large value (e.g., $C=2^k$) (step 717). The process then loops back to step 702 to receive a new request. Therefore, an iteration of the iterative proof method corresponds to steps 702 through 716. In each iteration of steps 702 through 716, the formal verification tool will try to prove the property—request to grant delay is at least C complete random sequences long—for all possible random number sequences that may be generated by a random number generator.

Figure 8A:
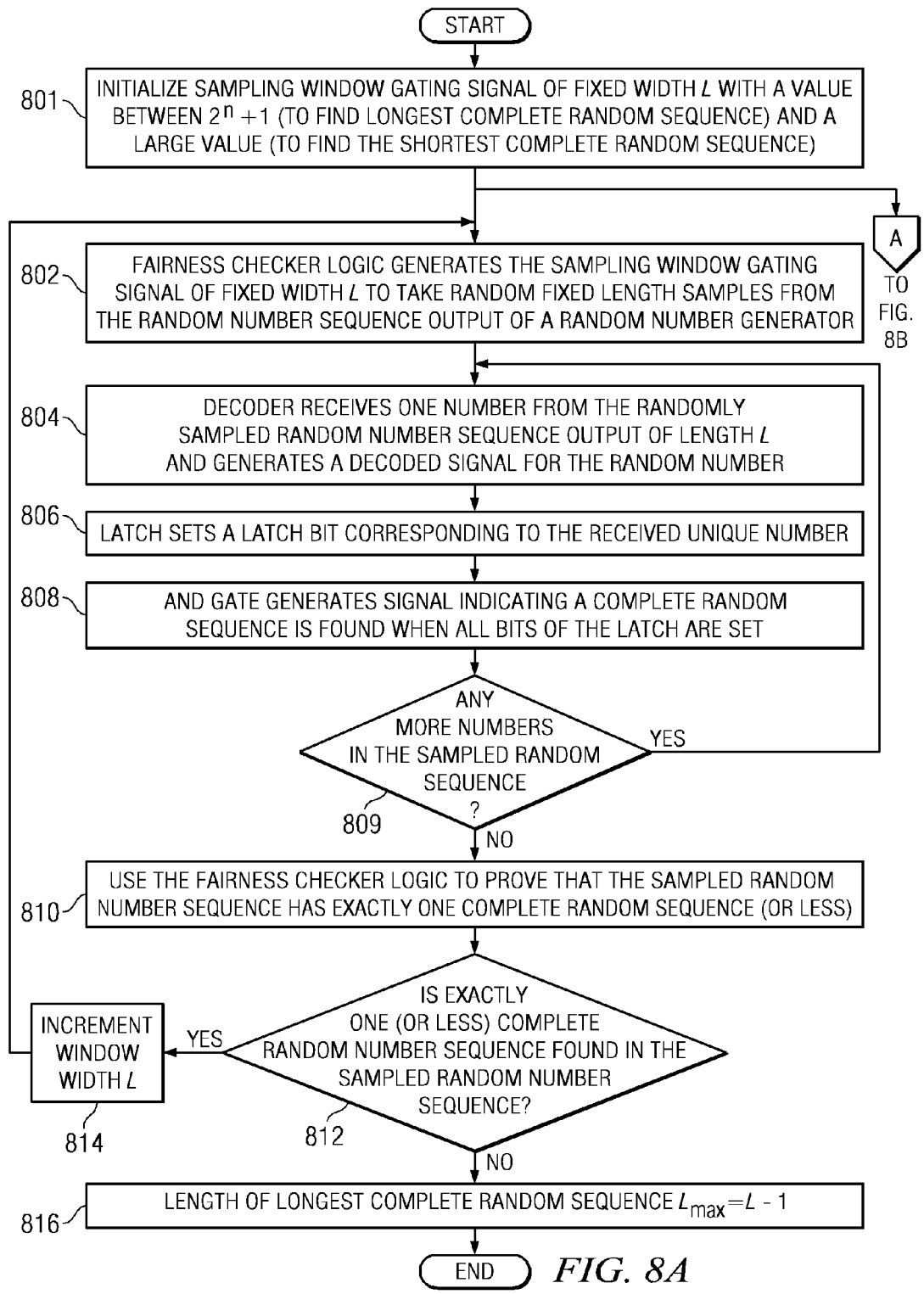
FIGS. 8A-8B illustrate a flowchart of a process for quantifying an upper and lower bounds of the length of complete random sequences in accordance with the illustrative embodiments.
Figure 8B:
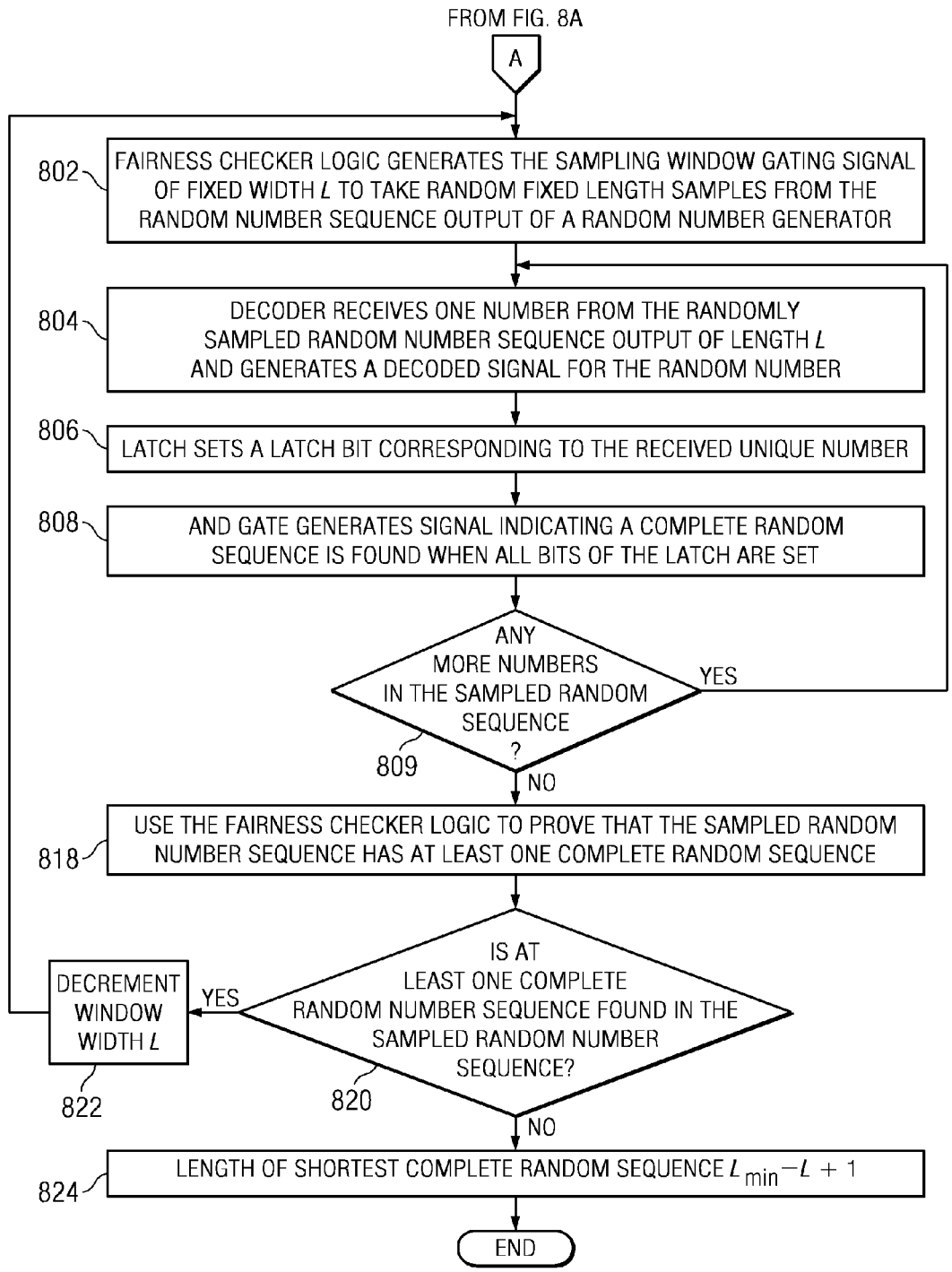

FIGS. 8A-8B illustrate a flowchart of a process for verifying the bounded fairness properties of an arbiter that uses a random priority based arbitration scheme in accordance with the illustrative embodiments. The process in FIGS. 8A-8B describes the second step in the formal verification scheme for quantifying the length (upper and lower bounds) of the complete random sequence in the sequence of random numbers generated by the specific pseudo random number generator logic used by the arbitration logic. The process described in FIGS. 8A-8B may be used for verifying the random arbitration logic (design under verification) along with the fairness checking logic used by the testbench 300 in FIG. 3. The process described in FIGS. 8A-8B may also be performed sequentially with or parallel to the process in FIG. 7.

The fairness checker logic implements a second verification step of determining the bounded fairness property of the system by quantifying the upper and lower fairness bounds of the request-to-grant delay of the arbiter. The process begins with the fairness checker logic initializing a sampling window gating signal of an initial fixed width L having a value of between $L \geq 2^N+1$ and a large value $L \gg 2^N$ (step 801). Based on the initial fixed width L value chosen in step 801, the process splits into two branches—one for determining the length of longest complete random sequence (upper bound) using the smaller initial fixed width L value, and one for determining the length of shortest complete random sequence (lower bound) using the larger initial fixed width L. The fairness checker logic then generates the sampling window gating signal of the chosen fixed width L to take random fixed length samples from the random number sequence output of the particular random number generator driving the arbiter (steps 802). A decoder in the logic receives one number from the randomly sampled number sequence output of length L from the random number generator and generates a decoded signal for the random number (steps 804). Upon receiving a unique random number from the decoder, the latch sets a latch bit corresponding to the received unique number (steps 806). When all of the bits in latch have been set, the AND gate that logically ANDs the latch outputs generates a signal indicating that a complete random sequence is found (steps 808).

For determining the length of longest complete random sequence (upper bound), the fairness checker logic is used to prove that the sampled random number sequence has exactly one or less than one complete random sequence (step 810). A determination is made as to whether exactly one or less than one complete random number sequence is found in the sampled random number sequence output (step 812). If exactly one (or less than one) complete random number sequence is found in the sampled random number sequence output ('yes' output of step 812), the fairness checker logic then increments the window width L (step 814) and returns to step 802 to sample the random number sequence output with the new fixed window length. However, if exactly one (or less than one) complete random number sequence has not been found ('no' output of step 812) in any possible random number sequence of length L, the fairness checker logic determines that the length of the longest complete random sequence has been found (step 816). The length of the longest complete random sequence is determined to be the length of the random number sequence output sampled in the previous iteration of the proof, or $L_{max}=L-1$ (step 816).

For determining the length of shortest complete random sequence (lower bound), the fairness checker logic is used to prove that the sampled random number sequence has at least one complete random sequence (step 818). A determination is made as to whether there is at least one complete random number sequence found in the sampled random number sequence output (step 820). If at least one complete random number sequence has been found in the sampled random number sequence output ('yes' output of step 820), the fairness checker logic then decrements the window width L (step 822) and returns to step 802 to sample the random number sequence output with the new fixed window length. However, if at least one complete random number sequence has not been found in the any possible sampled random number sequence output ('no' output of step 820), the fairness checker logic determines that the length of the shortest complete random sequence has been found (step 822). The length of the shortest complete random sequence is determined to be the length of the random number sequence output sampled in the previous iteration of the proof, or $L_{min}=L+1$ (step 816).

In one embodiment, the steps for determining the length of the longest complete random sequence may be implemented after determining the length of the shortest complete random sequence. When the length of the shortest complete random sequence (or $L_{min}$) has been determined, the value of $L_{min}$ may be used as the initial value of the sampling window gating signal of fixed width L used to determine the length of the longest complete random sequence. Using $L_{min}$ as the initial value of the sampling window gating signal starts the proof at the minimum length value for the complete random sequence, thereby reducing the number of iterations and proofs the formal verification tool must perform to find the longest complete random sequence. We can use a binary search approach to reduce the number of proofs and iterations the formal verification tool has to perform in each one of the verification steps.

Figure 9:
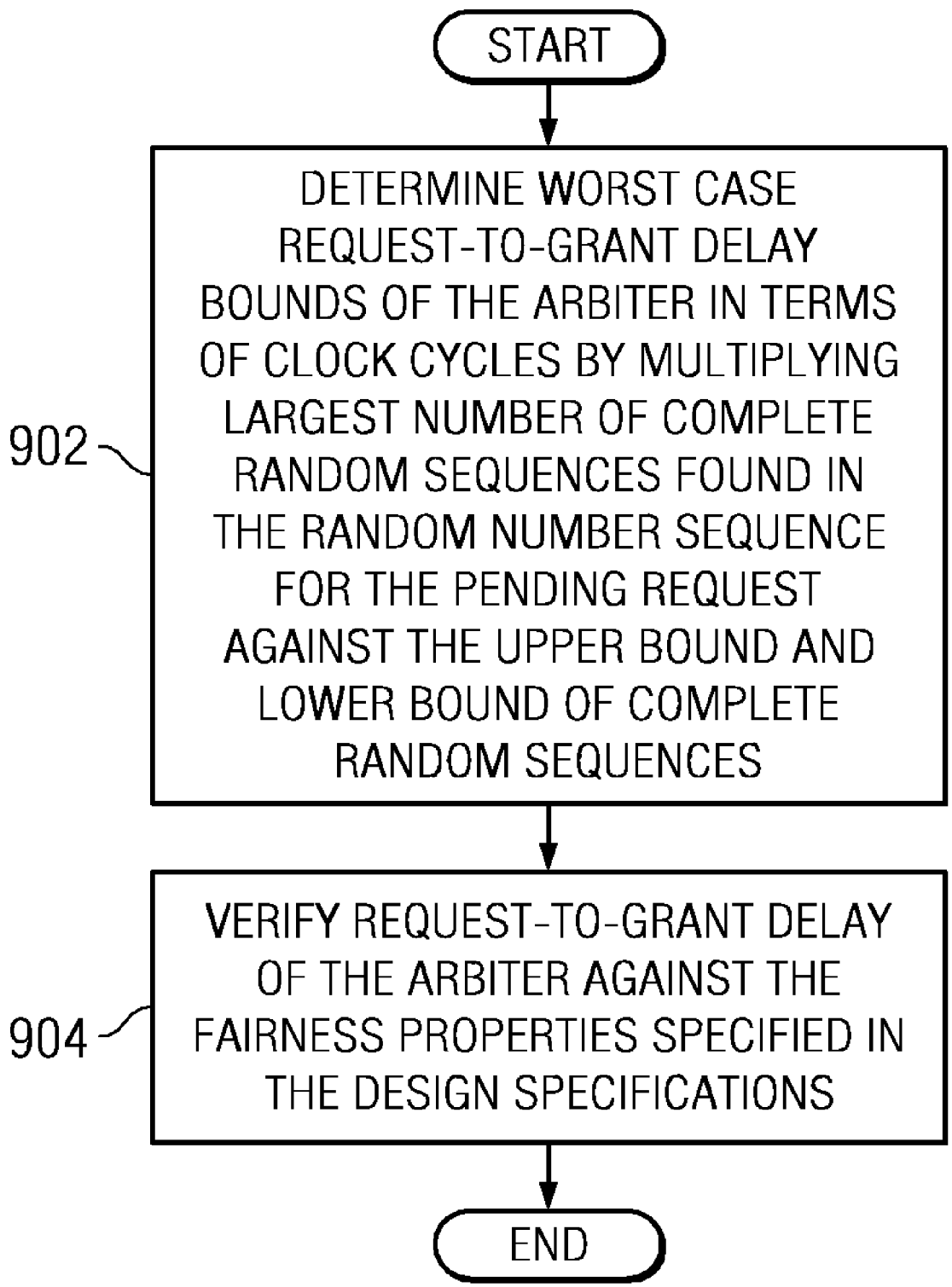
FIG. 9 is a flowchart of a process for determining the worst case request-to-grant delay bounds of an arbiter in terms of clock cycles in accordance with the illustrative embodiments.

FIG. 9 is a flowchart of a process for determining the worst case request-to-grant delay bounds of an arbiter in terms of clock cycles in accordance with the illustrative embodiments. The process in FIG. 9 describes the third step in the formal verification scheme for determining worst case request-to-grant delay bounds (in number of cycles) of the entire arbitration logic, including the particular pseudo random number generator logic driving the arbiter and the arbitration logic itself. The process described in FIG. 9 may be used for verifying the random arbitration logic (design under verification) along with the fairness checking logic used by the testbench 300 in FIG. 3. The process described in FIG. 9 may also be performed using the results obtained from the processes in FIGS. 7 and 8A-8B.

The process begins with determining the worst case request-to-grant delay bounds of the arbiter system in terms of a number of clock cycles by multiplying the largest number of complete random sequences generated in the random number sequence for a still pending request computed in the first verification process described in FIG. 7 against the length (upper bound and lower bound) of the complete random sequences computed in the second verification process described in FIGS. 8A-8B (step 902). For example, the formal verification method multiplies the largest number of complete random sequences C by the longest length of complete random sequence, and multiplies the largest number of complete random sequences C by the shortest length of complete random sequence. The formal verification method then verifies this worst case request-to-grant delay of the arbiter against the fairness properties specified in the design specifications to determine if the arbiter system is operating within the design specifications (step 904), with the process terminating thereafter.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for verifying request-to-grant delay properties of a random priority based arbiter system, the computer implemented method comprising:

determining, in terms of a number of complete random sequences, an upper bound of a request-to-grant delay of an arbiter, wherein a complete random sequence in a random number sequence is a shortest contiguous sequence of random numbers in the random number sequence having all possible unique random numbers at least once;

determining, in terms of a number of clock cycles, an upper bound and a lower bound of a length of a complete random sequence in the random number sequence generated by a random number generator used by the arbiter; and determining a worst case request-to-grant delay bounds of the arbiter system, in terms of a number of clock cycles, by combining the upper bound of the request-to-grant delay of the arbiter with the upper bound of the length of the complete random sequence and the lower bound of the length of the complete random sequence.

2. The computer implemented method of claim 1, further comprising:

verifying the worst case request-to-grant delay bounds are within design specifications.

3. The computer implemented method of claim 1, wherein determining an upper bound of a request-to-grant delay of an arbiter further comprises:

setting an initial value of a constant complete random sequence value in a comparator; responsive to detecting a request, resetting all bits in a latch and a counter comprising a count value of complete random sequences found in the random number sequence;

receiving a random number sequence output from a random number generator function;

generating a first signal for each unique random number in the random number sequence output;

responsive to receiving the first signal at the latch, setting a latch bit corresponding to a unique random number in the random number sequence output;

responsive to a determination that all latch bits in the latch have been set, generating a second signal indicating a presence of a complete random sequence in the random number sequence output;

responsive to receiving the second signal at the counter, incrementing the count value in the counter;

responsive to a determination that the request is no longer pending, comparing the incremented count value to the constant complete random sequence value in the comparator; and responsive to a determination that the count value in the counter equals the constant complete random sequence value in the comparator, determining the constant complete random sequence value in the comparator is a largest number of complete random sequences in the random number sequence output before the request was granted.

4. The computer implemented method of claim 3, further comprising:

responsive to a determination that the request is still pending, incrementing or decrementing the constant complete random sequence value in the comparator if the constant complete random sequence value in the comparator is not the largest number of complete random sequences in the random number sequence output.

5. The computer implemented method of claim 4, wherein the constant complete random sequence value is incremented if the initial value of the constant complete random sequence value is 1, and wherein the constant complete random sequence value is decremented if the initial value of the constant complete random sequence value is $2^k$, where k is a number of bits representing the constant complete random sequence value.

6. The computer implemented method of claim 1, wherein determining an upper bound of a length of a complete random sequence further comprises:

initializing a sampling window gating signal of a fixed width;

generating the sampling window gating signal of the fixed width;

obtaining fixed length samples of the random number sequence output of a random number generator used by the arbiter using the sampling window gating signal of a fixed width;

generating a first signal for a unique random number in the sampled random number sequence output;

responsive to receiving the first signal at the latch, setting a latch bit corresponding to a unique random number in the sampled random number sequence output;

responsive to a determination that all latch bits in the latch have been set, generating a second signal indicating a presence of a complete random sequence in the sampled random number sequence output;

responsive to a determination that there is exactly one or less than one complete random number sequence in the sampled random number sequence output, incrementing the fixed width of the sampling window gating signal to form a new fixed width and generating a new sampling window gating signal with the new fixed width; and responsive to a determination that there is not exactly one or less than one complete random number sequence in the sampled random number sequence output, determining that a current fixed width of a current sampling window gating signal is the upper bound of the length of a longest complete random sequence in the sampled random number sequence output.

7. The computer implemented method of claim 1, wherein determining a lower bound of a length of a complete random sequence further comprises:

generating a sampling window gating signal of a fixed width;

obtaining fixed length samples of the random number sequence output of a random number generator used by the arbiter using the sampling window gating signal of a fixed width;

generating a first signal for a unique random number in the sampled random number sequence output;

responsive to receiving the first signal at the latch, setting a latch bit corresponding to a unique random number in the sampled random number sequence output;

responsive to a determination that all latch bits in the latch have been set, generating a second signal indicating a presence of a complete random sequence in the sampled random number sequence output;

responsive to a determination that there is at least one complete random number sequence in the sampled random number sequence output, decrementing the fixed width of the sampling window gating signal to form a new fixed width and generating a new sampling window gating signal with the new fixed width; and responsive to a determination that there is not at least one complete random number sequence in the sampled random number sequence output, determining that a current fixed width of a current sampling window gating signal is the lower bound of the length of a longest complete random sequence in the sampled random number sequence output.

8. The computer implemented method of claim 1, wherein the step of determining an upper bound of a request-to-grant delay of an arbiter and the step of determining an upper bound and a lower bound of a length of a complete random sequence in the random number sequence generated by the random number generator used by the arbiter are performed serially or in parallel.

9. The computer implemented method of claim 1, wherein the step of determining an upper bound of a request-to-grant delay of an arbiter quantifies a bounded liveness property of an arbiter, and wherein the step of determining an upper bound and a lower bound of a length of a complete random sequence in the random number sequence generated by a random number generator used by the arbiter quantifies a bounded fairness property of the random number generator.

10. The computer implemented method of claim 1, wherein combining the upper bound of the request-to-grant delay of the arbiter and the upper bound and the lower bound of the length of the complete random sequence further comprises:
    multiplying the upper bound of the request-to-grant delay against the upper bound and lower bound of the length of the complete random sequence to form a worst case request-to-grant delay of the arbiter; and
    verifying the worst case request-to-grant delay of the arbiter against fairness properties within design specifications.

11. A computer program product for verifying request-to-grant delay properties of a random priority based arbiter system, the computer program product comprising:
    a computer usable storage medium having computer usable program code stored thereon, the computer usable program code comprising:
    computer usable program code for determining, in terms of a number of complete random sequences, an upper bound of a request-to-grant delay of an arbiter, wherein a complete random sequence in a random number sequence is a shortest contiguous sequence of random numbers in the random number sequence having all possible unique random numbers at least once;
    computer usable program code for determining, in terms of a number of clock cycles, an upper bound and a lower bound of a length of a complete random sequence in the random number sequence generated by a random number generator used by the arbiter; and
    computer usable program code for determining a worst case request-to-grant delay bounds of the arbiter system, in terms of a number of clock cycles, by combining the upper bound of the request-to-grant delay of the arbiter with the upper bound of the length of the complete random sequence and the lower bound of the length of the complete random sequence.

12. The computer program product of claim 11, further comprising:
    computer usable program code for verifying the worst case request-to-grant delay bounds are within design specifications.

13. The computer program product of claim 11, wherein the computer usable program code for determining an upper bound of a request-to-grant delay of an arbiter further comprises:
    computer usable program code for setting an initial value of a constant complete random sequence value in a comparator;
    computer usable program code for resetting, in response to detecting a request, all bits in a latch and a counter comprising a count value of complete random sequences found in the random number sequence;
    computer usable program code for receiving a random number sequence output from a random number generator function;
    computer usable program code for generating a first signal for each unique random number in the random number sequence output;
    computer usable program code for setting a latch bit corresponding to a unique random number in the random number sequence output responsive to receiving the first signal at the latch;
    computer usable program code for generating a second signal indicating a presence of a complete random sequence in the random number sequence output responsive to a determination that all latch bits in the latch have been set;
    computer usable program code for incrementing the count value in the counter responsive to receiving the second signal at the counter;
    computer usable program code for comparing the incremented count value to the constant complete random sequence value in the comparator responsive to a determination that the request is no longer pending; and
    computer usable program code for determining, in response to a determination that the count value in the counter equals the constant complete random sequence value in the comparator, the constant complete random sequence value in the comparator is a largest number of complete random sequences in the random number sequence output before the request was granted.

14. The computer program product of claim 13, further comprising:
    computer usable program code for incrementing or decrementing the constant complete random sequence value in the comparator if the constant complete random sequence value in the comparator is not the largest number of complete random sequences in the random number sequence output in response to a determination that the request is still pending.

15. The computer program product of claim 14, wherein the constant complete random sequence value is incremented if the initial value of the constant complete random sequence value is 1, and wherein the constant complete random sequence value is decremented if the initial value of the constant complete random sequence value is $2^k$, where k is a number of bits representing the constant complete random sequence value.

16. The computer program product of claim 11, wherein the computer usable program code for determining an upper bound of a length of a complete random sequence further comprises:
    computer usable program code for generating a sampling window gating signal of a fixed width;
    computer usable program code for obtaining fixed length samples of the random number sequence output of a random number generator used by the arbiter using the sampling window gating signal of a fixed width;
    computer usable program code for generating a first signal for a unique random number in the sampled random number sequence output;
    computer usable program code for setting a latch bit corresponding to a unique random number in the sampled random number sequence output in response to receiving the first signal at the latch;
    computer usable program code for generating, in response to a determination that all latch bits in the latch have been set, a second signal indicating a presence of a complete random sequence in the sampled random number sequence output;
    computer usable program code for incrementing, in response to a determination that there is exactly one or less than one complete random number sequence in the sampled random number sequence output, the fixed width of the sampling window gating signal to form a new fixed width and generating a new sampling window gating signal with the new fixed width; and computer usable program code for determining, in response to a determination that there is not exactly one or less than one complete random number sequence in the sampled random number sequence output, that a current fixed width of a current sampling window gating signal is the upper bound of the length of a longest complete random sequence in the sampled random number sequence output.

17. The computer program product of claim 11, wherein the computer usable program code for determining a lower bound of a length of a complete random sequence further comprises:

computer usable program code for initializing a sampling window gating signal of a fixed width computer usable program code for generating the sampling window gating signal of the fixed width;

computer usable program code for obtaining fixed length samples of the random number sequence output of a random number generator used by the arbiter using the sampling window gating signal of a fixed width;

computer usable program code for generating a first signal for a unique random number in the sampled random number sequence output;

computer usable program code for setting a latch bit corresponding to a unique random number in the sampled random number sequence output responsive to receiving the first signal at the latch;

computer usable program code for generating, in response to a determination that all latch bits in the latch have been set, a second signal indicating a presence of a complete random sequence in the sampled random number sequence output;

computer usable program code for decrementing, in response to a determination that there is at least one complete random number sequence in the sampled random number sequence output, the fixed width of the sampling window gating signal to form a new fixed width and generating a new sampling window gating signal with the new fixed width; and computer usable program code for determining, in response to a determination that there is not at least one complete random number sequence in the sampled random number sequence output, that a current fixed width of a current sampling window gating signal is the lower bound of the length of a longest complete random sequence in the sampled random number sequence output.

18. The computer program product of claim 11, wherein the computer usable program code for of determining an upper bound of a request-to-grant delay of an arbiter and the step of determining an upper bound and a lower bound of a length of a complete random sequence in the random number sequence generated by the random number generator used by the arbiter are performed serially or in parallel.

19. The computer program product of claim 11, wherein the computer usable program code for combining the upper bound of the request-to-grant delay of the arbiter and the upper bound and the lower bound of the length of the complete random sequence further comprises:

computer usable program code for multiplying the upper bound of the request-to-grant delay against the upper bound and lower bound of the length of the complete random sequence to form a worst case request-to-grant delay of the arbiter; and computer usable program code for verifying the worst case request-to-grant delay of the arbiter against fairness properties within design specifications.

20. A data processing system for verifying request-to-grant delay properties of a random priority based arbiter system, the data processing system comprising:
a bus;

a storage device connected to the bus, wherein the storage device contains computer usable code;

at least one managed device connected to the bus;

a communications unit connected to the bus; and a processing unit connected to the bus, wherein the processing unit executes the computer usable code to determine, in terms of a number of complete random sequences, an upper bound of a request-to-grant delay of an arbiter, wherein a complete random sequence in a random number sequence is a shortest contiguous sequence of random numbers in the random number sequence having all possible unique random numbers at least once; determine, in terms of a number of clock cycles, an upper bound and a lower bound of a length of a complete random sequence in the random number sequence generated by a random number generator used by the arbiter; and determine a worst case request-to-grant delay bounds of the arbiter system, in terms of a number of clock cycles, by combining the upper bound of the request-to-grant delay of the arbiter with the upper bound of the length of the complete random sequence and the lower bound of the length of the complete random sequence.

* * * * *